United States Patent

Meyer et al.

[11] Patent Number: 5,525,891
[45] Date of Patent: Jun. 11, 1996

[54] POWER-SUPPLY-APPARATUS IN A VEHICLE

[75] Inventors: Friedhelm Meyer, Illingen; Wunibald Frey, Schwiebderdingen; Mathias Doege, Erligheim, all of Germany

[73] Assignee: Robert Bosch GmbH, Stuttgart, Germany

[21] Appl. No.: 87,688

[22] PCT Filed: Sep. 10, 1992

[86] PCT No.: PCT/DE92/00769

§ 371 Date: Jul. 2, 1993

§ 102(e) Date: Jul. 2, 1993

[87] PCT Pub. No.: WO93/11003

PCT Pub. Date: Jun. 10, 1993

[30] Foreign Application Priority Data

Nov. 27, 1991 [DE] Germany .......................... 41 38 943.3

[51] Int. Cl.⁶ .................................................. H01M 10/44
[52] U.S. Cl. .................................................. 320/15; 320/16
[58] Field of Search .................................. 320/15, 16, 17

[56] References Cited

U.S. PATENT DOCUMENTS

| | | |
|---|---|---|
| 3,806,790 | 4/1974 | Marshall . |
| 4,100,474 | 7/1978 | Pfeffer et al. ............................. 320/17 |
| 4,127,782 | 11/1978 | Omura et al. ......................... 307/10 R |
| 4,345,197 | 8/1982 | Wheadon et al. .......................... 320/6 |
| 4,489,242 | 12/1984 | Worst . |
| 4,516,066 | 5/1985 | Nowakowski ............................. 320/15 |
| 4,723,105 | 2/1988 | Matouka et al. . |
| 4,757,249 | 7/1988 | Farber et al. ............................. 320/15 |

FOREIGN PATENT DOCUMENTS

| | | |
|---|---|---|
| 0116213 | 8/1984 | European Pat. Off. . |
| 3312171 | 10/1984 | Germany . |
| 3622157 | 1/1987 | Germany . |
| 3812577 | 10/1989 | Germany . |
| 979969 | 1/1965 | United Kingdom . |
| 1585915 | 3/1981 | United Kingdom . |
| 7900617 | 9/1979 | WIPO . |

*Primary Examiner*—Peter S. Wong
*Assistant Examiner*—Patrick B. Law
*Attorney, Agent, or Firm*—Michael J. Striker

[57] ABSTRACT

A power supply for a motor vehicle includes an additional voltage storage associated with the starter and the starter is separated from the rest of the vehicle supply system during the starting process by a charging/separating module. Since different variables of the vehicle supply system are supplied to this charging/separating module and corresponding measurements and detection take place within this module, the charging/separating module itself switches off or switches over in a manner which is optimally adapted to requirements.

Since the voltage storage associated with the starter and the rest of the vehicle supply battery can be operated completely independently from one another, they can be freely selected based on requirements (starting or buffering). A particularly reliable and safe charging of this voltage storage is ensured at a reduced nominal voltage of the voltage storage, also designated as starter storage.

10 Claims, 4 Drawing Sheets

POWER-SUPPLY-APPARATUS IN A VEHICLE

BACKGROUND OF THE INVENTION

The present invention relates to a power supply device in a motor vehicle.

Formerly, the power supply in a motor vehicle was achieved in most cases with a single battery charged by a generator. In modern motor vehicles with a plurality of electrical consumers one battery is sometimes no longer sufficient for the power supply so that two separate batteries which are connected either in series or in parallel must be used.

Since most of the electrical consumers in the motor vehicle require a supply voltage adjusted to a constant value, supply problems occur particularly during the starting process. This is because the starter has a low internal resistance and therefore overloads the vehicle supply system by a high current of more than 100 amperes so that the vehicle supply voltage drops during the starting process to a value at which e.g. the ignition or the injection no longer functions perfectly.

To avoid this problem in a vehicle supply system for a motor vehicle known from DE-OS 38 12 577, the starter is connected to a battery, while the sensitive consumers requiring constant voltage are connected to another battery. The two batteries can be supplied with voltage optionally by one or two separate generators.

However, the known vehicle supply system for a motor vehicle has the disadvantage that the connection between the two batteries cannot be interrupted when starting so that a drop in voltage at the battery connected with the starter can affect the rest of the vehicle supply system.

A further disadvantage of the known vehicle supply system consists in that the nominal voltage of the battery connected with the starter is higher than the nominal voltage of the other battery so that a discharged starter battery cannot easily be recharged by the other battery.

SUMMARY OF THE INVENTION

Accordingly, it is an object of the present invention to provide a power supply device in a motor vehicle, which avoids the disadvantages of the prior art.

In keeping with these objects and with others which will become apparent hereinafter, one feature of the present invention resides, briefly stated, in a power supply device for a motor vehicle with a first voltage storage for supplying the motor vehicle supply system and a second voltage storage which is connected with the first voltage storage and with which the starter can be connected, and at least one generator for charging the voltage storages, wherein in accordance with the present invention the voltage storages are connected with one another and with the generator or generators via a charging/separating module which interrupts the connection between the voltage storage and between at least one of the voltage storages and at least one generator as a function of parameters which can be predetermined.

When the power supply device is designed in accordance with the present invention, it has the advantage over the prior art that two voltage storages are provided, e.g. the normal battery for the vehicle supply system and a so-called starter storage for supplying the starter, and the starter as well as the respective voltage storage are separated from the rest of the vehicle supply system and from the first voltage storage during the starting process via a charging/separating module so that the voltage drop caused by the starter has no effect on the remaining vehicle supply system voltage.

When the nominal voltage of the second voltage storage associated with the starter is selected lower than the nominal voltage of the first voltage storage, the second voltage storage which is extensively discharged after repeated attempts at starting the vehicle can easily be recharged from the first voltage storage via the charging/separating module.

Since a number of vehicle supply system parameters or measurement variables are supplied to the charging/separating module, this charging/separating module can automatically switch over or switch off as a function of predetermined parameters.

When a step-up transformer is associated with the charging/separating module in addition, the nominal voltage of the starter battery can also be higher than or identical to the nominal voltage of the vehicle supply system battery. In this case it would also be possible to charge the voltage storage for additional starting attempts when the battery for the vehicle supply system is virtually "empty".

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
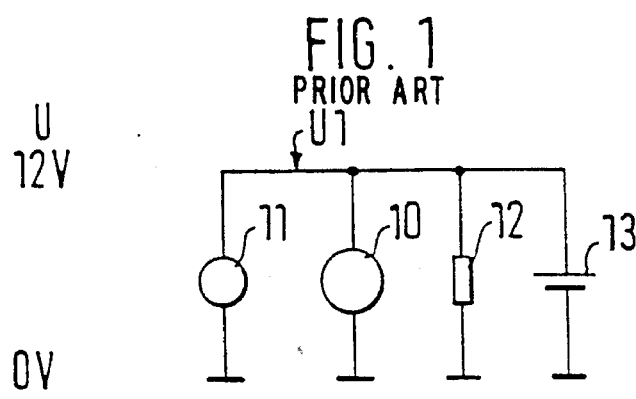
FIG. 1 shows a conventional vehicle supply system.

A conventional vehicle supply system is shown schematically in FIG. 1. A generator 10 and the starter 11 as well as the consumers 12 shown as a resistor and the battery 13 are supplied with voltage.

The output voltage of the generator 10 is adjusted to U1; the voltage distribution indicated on the left-hand side of FIG. 1 is conventionally 0 volts to ground and 12 volts at the positive output of the generator.

Figure 2:
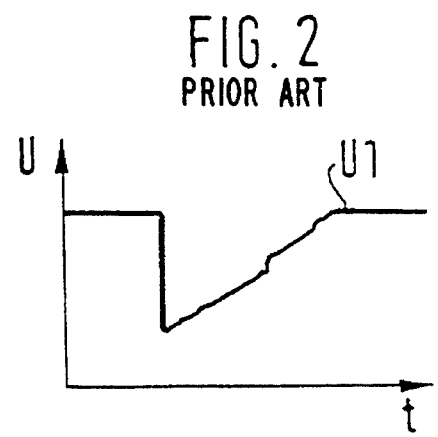
FIG. 2 shows the respective voltage curve during the starting process.

However, when the starter 11 is actuated, the output voltage of the generator designated by U1 suddenly decreases sharply, since the starter has a very low internal resistance. The resulting voltage distribution is plotted over time t in FIG. 2.

Figure 3:
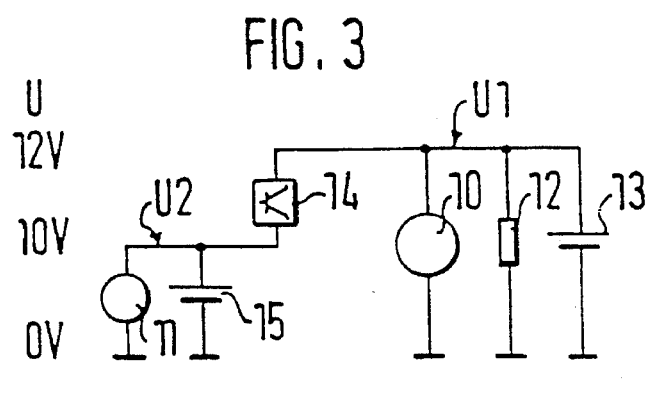
FIGS. 3 and 5 show arrangements for the power supply in a motor vehicle according to the invention.

To prevent the voltage drop occurring during the starting process from affecting the electrical consumers 12 of the motor vehicle, the starter 11 in the embodiment example of the invention indicated in FIG. 3 is connected to the generator via a charging/separating module 14. An additional voltage storage, battery 15 in the embodiment example, is connected in parallel to the starter. This voltage storage is also designated as a starter storage.

Figure 4:
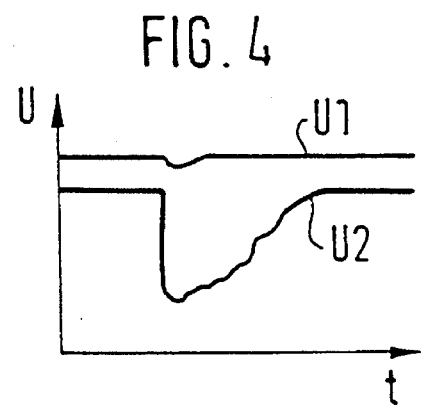
FIGS. 4 and 6 show the respective voltage curves during a starting process.

The voltage distribution adjusted in this power-supply device is indicated in FIG. 4. The output voltage of the generator is again designated by U1. The voltage at the starter 11 and the battery 15 is designated by U2. U2 drops sharply during the starting process, but this has no effect on voltage U1, since the charging/separating module 14 interrupts the connection between the starter 11 and battery 15 and the rest of the vehicle supply system.

Figure 7:
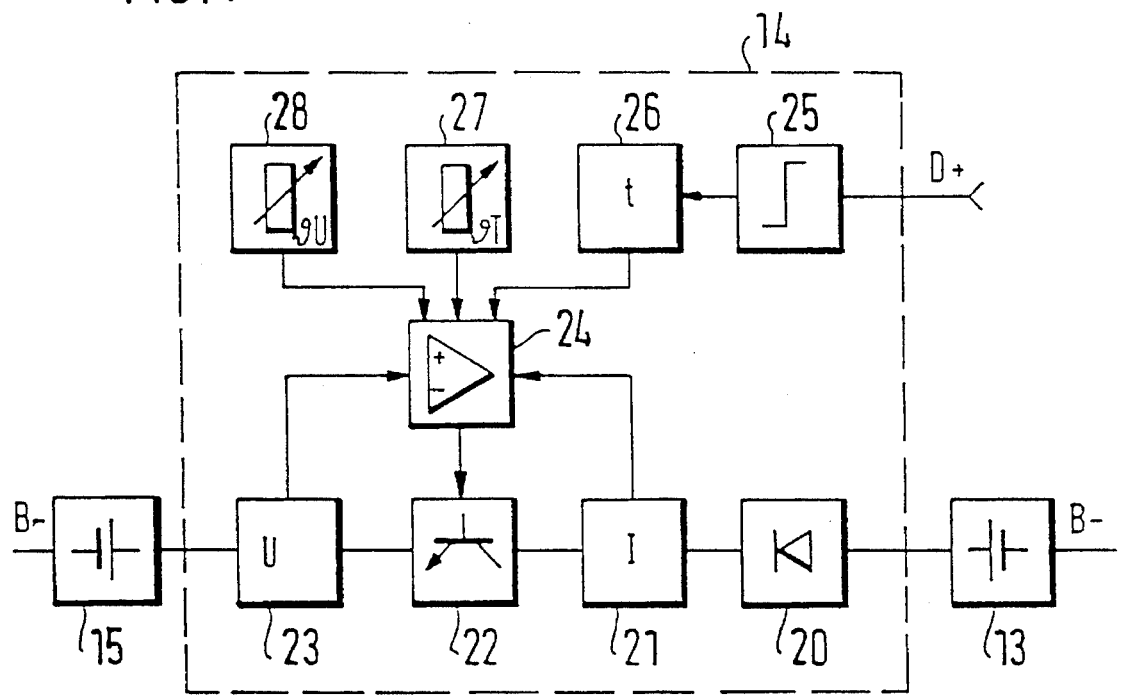
FIGS. 7 and 8 show block wiring diagrams of the charging/separating module shown schematically in FIGS. 3 and 5.
Figure 8:
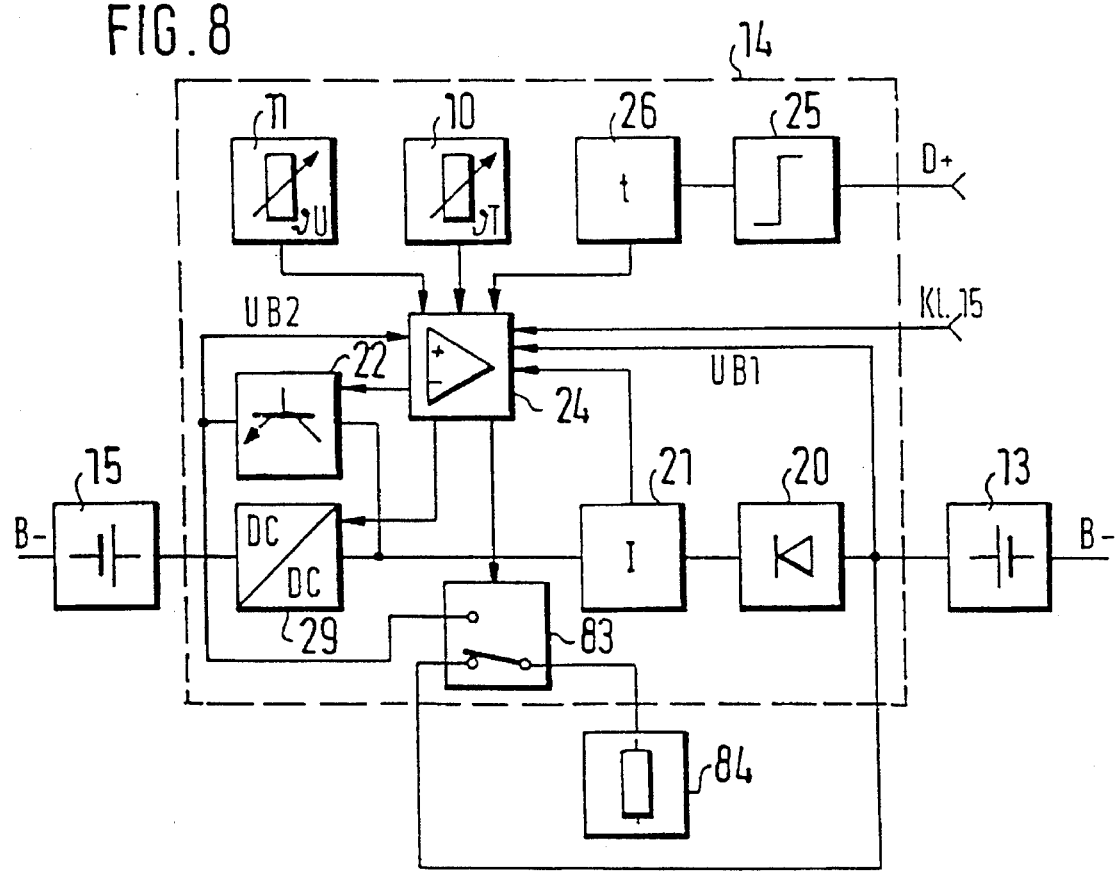
Figure 9:
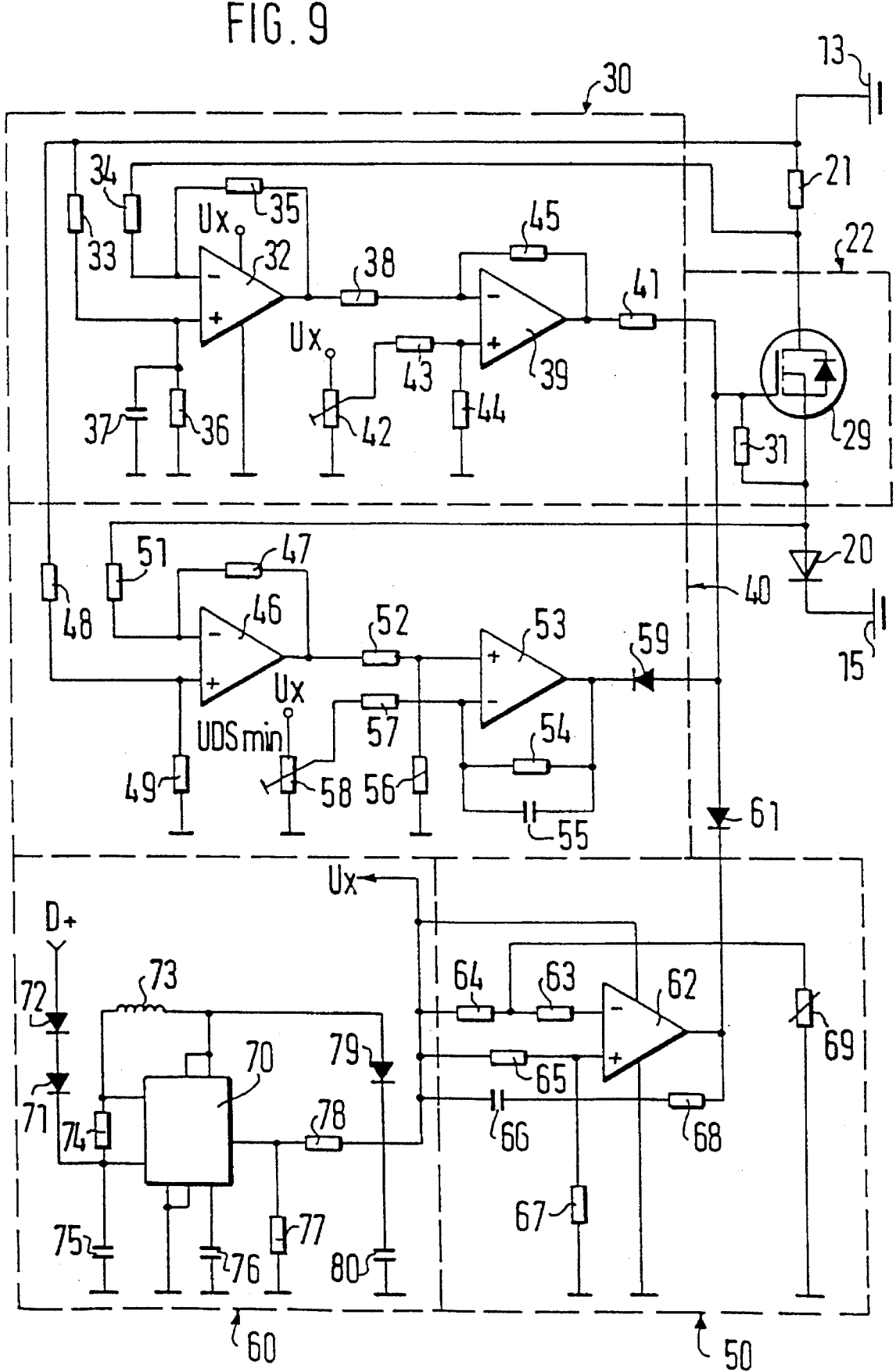
FIG. 9 shows a wiring example for a charging/separating module.

The exact construction and function of the charging/separating module 14 is shown in FIGS. 7 to 9 and follows from the relevant description.

In the embodiment example shown in FIG. 3, a voltage distribution is aimed at in the rest state where U1 is 12 volts in the normal vehicle supply system and U2 is 10 volts at the starter. The nominal voltage of the battery 15 also amounts to 10 volts. Such a voltage distribution ensures that a discharged battery 15 is charged quickly and reliably by the generator or battery 13 via the charging/separating module 14.

Figure 5:
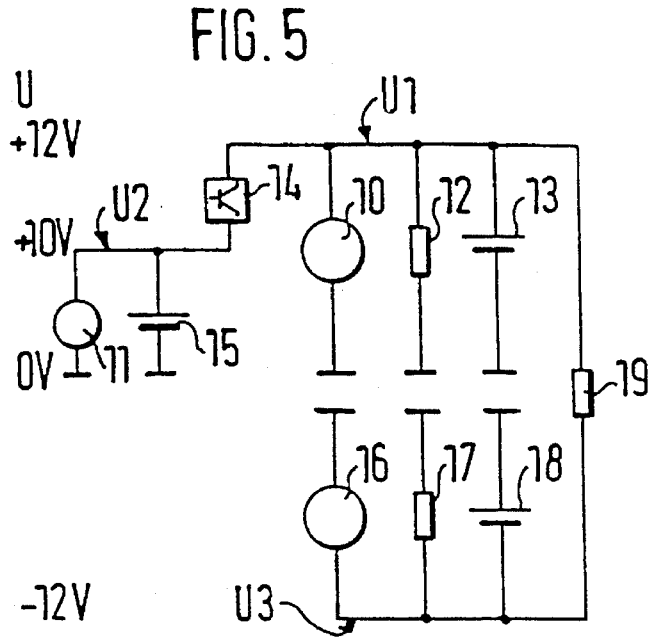

FIG. 5 shows an embodiment example in which there is another generator 16 and another battery 18. The consumers 12, 17 and 19 are connected to the batteries 13, 18 in a suitable manner.

The aimed for voltage distribution in the unloaded state is +12 volts for U1, +10 volts for U2, 0 volts to ground, and −12 volts for U3. These voltages are selected voltages. Other voltages are also conceivable, particularly a voltage of −24 volts for U3. However, it is essential in this embodiment example that the voltage U2 at the starter (11) is less than voltage U1, since this again enables a quick and reliable charging of the battery 15 from the battery 13.

Figure 6:
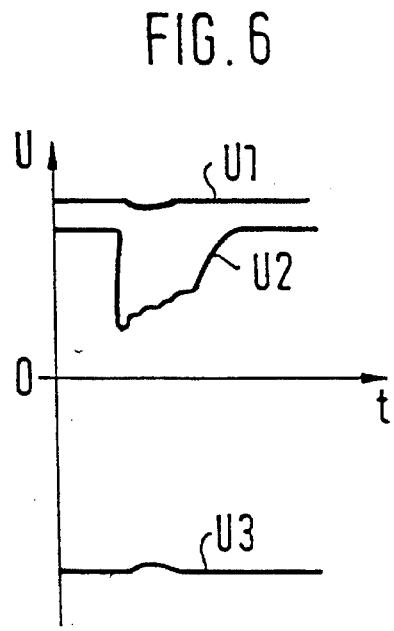

The voltage curve of the embodiment example according to FIG. 5 occurring during starting is plotted in FIG. 6. It can be seen that only voltage U2 drops sharply during the starting process. The voltage U1 only drops insignificantly and U3 increases slightly. This voltage curve is achieved with the aid of the charging/separating module 14 which separates the starter 11 and the battery 15 from the rest of the vehicle supply system during the starting process.

FIG. 7 shows a block wiring diagram of a possible charging/separating module. This charging/separating module is connected to the generator terminals D+ and between the positive terminals of the two batteries 13 and 15; its other pole is connected to the battery terminal B−.

The individual elements of the charging/separating module are a back diode 20, whose anode is connected with the positive pole of the vehicle supply system battery 13, and a current detector 21 which is connected to the back diode 20 on the one hand and to the power switch 22 on the other hand, the latter being connected in turn with the positive pole of the starter battery 15 via a charging voltage detector 23.

The central element of the charging/separating module 14 is an amplifier circuit 24 to which signals are supplied from the current detector 21 and from the charging voltage detector 23 and which contains additional signals which show whether or not the engine is running. Also, the temperature of the power switch 22 and the ambient temperature are fed to the amplifier circuit 24. These temperatures are measured by two temperature sensors 27 and 28. A device for detecting whether or not the engine is running 25 detects whether the engine is running or is stopped. If necessary, the output signal of this device 25 is delayed in a time delay device 26 before being fed to the amplifier circuit 24.

Another embodiment example for a charging/separating module 14 is shown as a block wiring diagram in FIG. 8. This charging/separating module 14 differs from that illustrated in FIG. 7 in that a dc voltage converter 29, e.g. a so-called step-up converter which can be controlled by the amplifier circuit 24 and is capable of generating a higher voltage from a low voltage, is connected between the amplifier circuit 24 and the starter battery 15.

In the embodiment example according to FIG. 8, the power switch 22 is connected parallel to the dc voltage transformer 29 and can serve to bridge the dc voltage transformer 29 when the amplifier circuit 24 is controlled in a corresponding manner. The power switch is controlled as a function of the measurement variables fed to the amplifier circuit 24.

Further, the embodiment example according to FIG. 8 has an additional switching element 83 which switches the consumers 84 necessary for starting (engine management, injection pump) to the battery 13 or 15 depending on the control effected by the amplifier circuit 24. This switching element is likewise controlled as a function of the measurement variables fed to the amplifier circuit 24.

These measurement variables correspond in large degree to the measurement variables indicated in the description of FIG. 7. The voltage in both batteries is also measured and a determination is effected at terminal K1.15 as to whether the ignition is switched on or off.

The complete circuit arrangement of a simple embodiment example for a charging/separating module 14 is shown in FIG. 9. This circuit arrangement is connected between the vehicle supply system battery 13 and the starting battery 15 and is also connected with the terminal D+ of the generator.

In particular, the circuit arrangement of the charging/separating module shown in FIG. 9 includes the current detector 21, the power switch 22, the back diode 20, the circuit arrangement for regulating current 30, the circuit arrangement for regulating voltage 40, overheating protection 50, and the circuit arrangement for generating the supply voltage for the amplifier circuits which is constructed as a dc voltage converter 60.

The vehicle supply system battery 13 is connected with the starter battery 15 via the current detector 21, which can be constructed e.g. as a resistor (shunt), the power switch 22, and the back diode 20. The power switch 22 is constructed as a field effect transistor 29. Another resistor 31 is located between the anode of the back diode 20 and the drain electrode of the field effect transistor 29.

The circuit 30 for regulating current is connected with the vehicle supply system battery, with the connection between the current detector 21 and the power switch 22, and with the drain electrode of the field effect transistor 29 of the power switch 22, as well as with the voltage regulating circuit 40, the temperature protection 50 and the dc voltage transformer 60.

The current-regulating circuit arrangement 30 has a first operational amplifier 32 which is wired as a comparator. Its noninverting input is connected with the battery 13 via a resistor 33 and its inverting input is connected by a resistor 34 with the connection point between the current detector 21 and the power switch 22 and also with the output of the operational amplifier 32 via a resistor 35.

Another resistor 36 is connected between the noninverting input of the operational amplifier 32 and ground, and a capacitor 37 is arranged parallel to this resistor 36. The supply voltage of the operational amplifier 32 is designated by Ux and is generated by means of the dc voltage converter 60 which will be described in the following.

A connection leads from the output of the operational amplifier 32, via a resistor 38, to another operational amplifier 39 which is wired as a comparator, fed back via a resistor 45 and connected with the field effect transistor 29 via another resistor 41.

A reference voltage which can be derived from the supply voltage Ux is fed to the noninverting input of the operational amplifier 39 via a resistor network 42, 43, 44. The resistor 42 can be variably adjusted while taking into account that a maximum current Imax may not be exceeded.

The voltage-regulating circuit arrangement 40 includes a first operational amplifier 46 which is wired as a comparator, its inverting input being fed back with the output via a resistor 47. The operational amplifier 46 is connected with the current-regulating circuit arrangement 30 via a resistor 48 and is connected to ground via another resistor 49.

A resistor 51 leads from the inverting input of the operational amplifier 46 to the connection between the field effect transistor 29 of the power switch and back diode 20.

The output of the operational amplifier 46 is connected via a resistor 52 with another operational amplifier 53 which is wired as a comparator. This operational amplifier 53 is fed back via a resistor 54 and a capacitor 55.

Further, the noninverting input of the operational amplifier 53 is connected to ground via a resistor 56. An adjustable voltage UDSmin which is derived in the adjustable resistor 58 from the supply voltage Ux is fed to the inverting input of the operational amplifier 53 via resistors 57, 58.

The output of the operational amplifier 53 leads to the drain electrode of the field effect transistor 29 via a diode 59 and to the temperature protection 50 via another diode 61.

This temperature protection 50 includes an operational amplifier 62 whose output is connected with the diode 61 and whose inputs are connected via resistors 62, 64 and 65 with the dc voltage transformer. A capacitor 66 lies parallel to the resistor 65 and the connection of the capacitor 66 at the noninverting input of the operational amplifier 62 is connected to ground via a resistor 67 and with the output of the operational amplifier 62 via a resistor 69.

A temperature-dependent resistor 69 lies between the connection point of the resistor 63 and 64 and ground. This resistor is e.g. a PTC resistor whose value changes as a function of the temperature of the field effect transistor 29.

The dc voltage converter 60 includes an integrated switching circuit 70 which is connected via two diodes 71, 72 with the generator terminal D+. A coil 73 and a resistor 74 lie between the inputs of this integrated switching circuit 70. The resistor 72 is connected to ground via a capacitor 75. Additional inputs and outputs of the integrated switching circuit 70 are connected to ground via a capacitor 76 and a resistor 77. Another resistor 78 as well as a diode 79 and a capacitor 80 lie between an output of the integrated switching circuit 70 and ground. The connection point between the resistor 78, the diode 79 and the capacitor 80 leads to the temperature protection 50. The supply voltage Ux for supplying the operational amplifier occurs at this connection point. It can be adjusted e.g. to 26 volts.

With the use of the charging/separating modules shown in FIGS. 7 to 9 in combination with devices for supplying power in a motor vehicle according to FIG. 3 or 5, it is ensured that the consumers 12, 17, 19 are connected to a constant voltage U1 and U3, respectively, also during the starting process. The starter is supplied by its own battery 15 or by another starter storage which is designed to serve the needs of the starter (high-current discharge). The rest of the vehicle supply system can be supplied by a conventional battery 13. Instead of this battery 13, another battery different from that formerly used can also be employed. This battery need no longer be designed for high starting currents, but need only be designed as a fixed-cycle battery, also known as a traction battery. This makes it possible to select the two voltage storages independently from one another.

During normal operation, the starter 11 and the respective battery or starter storage is connected with the rest of the vehicle supply system via the charging/separating module 14. The battery 15 or the starter storage can be charged by the generator 10 or from the battery 13. During the starting process, the charging/separating module 14 automatically interrupts the connection between the starter or starter battery and the rest of the vehicle supply system so that the high current required by the starter cannot lead to a voltage drop in the normal vehicle supply system.

Since a large amount of data concerning the vehicle state is fed to the charging/separating module 14, it is capable of automatically interrupting or restoring the connection between the starter 11 and the starter battery 15 and the rest of the vehicle supply system in an optimal manner. Accordingly, reference number 14 designates a kind of "intelligent" charging/separating module.

In the power-supply devices shown in FIGS. 3 and 4 the nominal voltage of the starter battery 15 is lower than the nominal voltage of the vehicle supply system battery 13. When the starter battery is connected with the rest of the vehicle supply system by the charging/separating module 14 after the starting process is concluded, the starter battery 15 is charged in a particularly quick and reliable manner exclusively by the battery 15 with the higher nominal voltage when the engine is stopped.

When using a charging/separating module according to FIG. 8, in which a dc voltage converter is also provided, a battery with a nominal voltage higher than or equal to that of the vehicle supply system battery can be used as a starter storage. The voltage transformer 29 then increases the charging voltage at appropriate times to charge the starting battery 15.

Further, when suitably controlled, the additional switching element 83 also enables starting when the battery 13 is empty in that the consumers necessary for starting are supplied with power by the battery 15 during the starting process.

Figure 10:
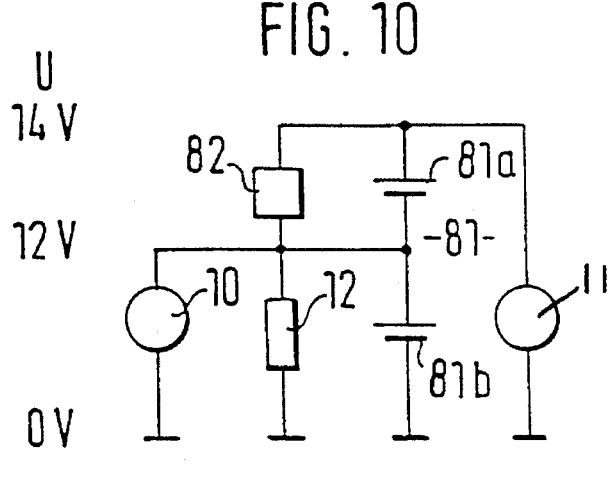
FIG. 10 shows another device for the power supply in a motor vehicle according to the invention.

FIG. 10 shows an embodiment example of the invention which operates without the charging/separating module, but which has a charging device suitable for this purpose which partially assumes its function. In this embodiment example, the generator 10 is connected with the electrical consumers of the vehicle supply system 12 as well as with a part of the voltage storage 81.

This voltage storage 81, e.g. including a battery with (6+1) cells, is connected in such a way that six cells of the battery are used for supplying the normal vehicle supply system and the seventh cell is switched on only when starting. This seventh cell is recharged via a separate charging device 82 connected between the positive and negative poles of the seventh cell 81a and the positive pole of the other cells 81b. In this embodiment example, the conventional vehicle supply system voltage is 12 volts, but the voltage dropping at the starter is 14 volts.

Figure 11:
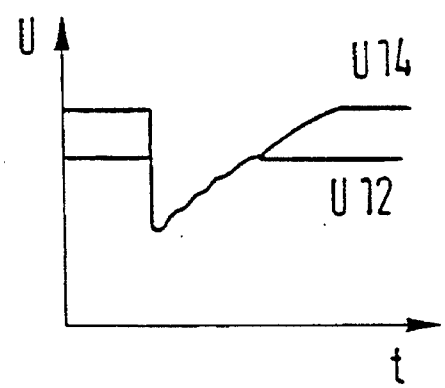
FIG. 11 shows the voltage curves during a starting process in a device according to FIG. 10.

A voltage drop occurs when starting. But this drop is not as steep since it proceeds from 14 volts, rather than from 12 volts as in conventional vehicle supply systems. As shown in FIG. 11, in which the curve of the voltage is plotted over time, the voltage minimum is approximately 2 volts higher than in a conventional vehicle supply system.

It will be understood that each of the elements described above, or two or more together, may also find a useful application in other types of constructions differing from the types described above.

While the invention has been illustrated and described as embodied in a power supply device for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power supply device for a motor vehicle, comprising a first voltage storage for supplying a motor vehicle supply system; a second voltage storage electrically connected to said first voltage storage and electrically connectable with a starter; at least one generator for charging said voltage storages; and a charging/separating module establishing an electrical connection of said voltage storages with one another and with said at least one generator and interrupting the electrical connection between said voltage storages and between at least one of said voltage storages and said at least one generator as a function of predeterminable parameters, said charging/separating module having an amplifier circuit and a power switch which is controlled by said amplifier circuit and is in a conductive or blocking state depending on a control signal of said amplifier circuit.

2. A power supply device as defined in claim 1, wherein at least one of said storages is connectable with additional electrical consumers.

3. A power supply device as defined in claim 1, wherein at least one of said storages is connectable with additional short-time electrical consumers.

4. A power supply device as defined in claim 1, wherein said voltage storages have different nominal voltages.

5. A power supply device as defined in claim 1; and further comprising a second generator; and a third voltage storage connected with said second generator and charged by the latter.

6. A power supply device as defined in claim 1, wherein said charging/separating module also has a switching element which is controlled by said amplifier circuit.

7. A power supply device as defined in claim 1, wherein said charging/separating module has a step-up transformer which is connected in parallel with said power switch, and said conductive or blocking state of said power switch is controlled via said amplifier circuit by the control signal.

8. A power supply device as defined in claim 1; and further comprising means for feeding at least one signal to said amplifier circuit to form said control signal.

9. A power supply device as defined in claim 8, wherein said means for feeding said at least one signal includes means for feeding said at least one signal selected from the group consisting of current intensity signal, output voltage signal, temperature of said power switch signal, ambient temperature signal, engine running/stopped signal, input voltage and ignition "on"/"off" signal.

10. A power supply device as defined in claim 9; and further comprising means for delaying the engine running/stopped signal and feeding the delayed signals to said amplifier circuit.

\* \* \* \* \*